(12) United States Patent
Palacios Orueta

(10) Patent No.: US 8,662,895 B2
(45) Date of Patent: Mar. 4, 2014

(54) SYSTEM, METHOD, COMPUTER PROGRAM AND DATA STRUCTURE WHICH ARE USED TO FACILITATE LANGUAGE UNDERSTANDING AND/OR LANGUAGE LEARNING

(75) Inventor: Angel Palacios Orueta, Madrid (ES)

(73) Assignee: Linguaversal, SL, Madrid (ES)

( * ) Notice: Subject to any disclaimer, the term of this patent is extended or adjusted under 35 U.S.C. 154(b) by 885 days.

(21) Appl. No.: 10/582,186

(22) PCT Filed: Dec. 11, 2004

(86) PCT No.: PCT/ES2004/000552
§ 371 (c)(1),
(2), (4) Date: Jul. 23, 2007

(87) PCT Pub. No.: WO2005/055691
PCT Pub. Date: Jun. 23, 2005

(65) Prior Publication Data
US 2007/0281286 A1 Dec. 6, 2007

(30) Foreign Application Priority Data
Dec. 12, 2003 (ES) .................................. 200302943

(51) Int. Cl.
*G09B 19/00* (2006.01)
(52) U.S. Cl.
USPC .......................................... 434/156; 434/157
(58) Field of Classification Search
USPC .................. 434/156–157, 177, 185
See application file for complete search history.

(56) References Cited

U.S. PATENT DOCUMENTS

| 4,731,021 A * | 3/1988 | Chan ............................. 434/156 |
| 4,807,905 A * | 2/1989 | Reagan ........................ 281/15.1 |
| 5,193,147 A * | 3/1993 | Amari et al. .................. 715/234 |
| 5,275,569 A * | 1/1994 | Watkins ........................ 434/157 |
| 5,480,306 A * | 1/1996 | Liu ............................... 434/156 |
| 5,697,789 A * | 12/1997 | Sameth et al. ................. 434/157 |
| 6,009,397 A * | 12/1999 | Siegel ........................... 704/270 |
| 6,120,297 A * | 9/2000 | Morse et al. ................... 434/169 |
| 6,254,395 B1 * | 7/2001 | Breland et al. ................. 434/156 |
| 6,343,935 B1 * | 2/2002 | Clements ...................... 434/156 |
| 6,468,084 B1 * | 10/2002 | MacMillan ................... 434/185 |
| 6,736,641 B2 * | 5/2004 | Quiroz .......................... 434/157 |
| 7,321,360 B1 * | 1/2008 | Goren ........................... 345/168 |
| 7,346,489 B1 | 3/2008 | Bever et al. |
| 7,743,324 B1 | 6/2010 | Bever et al. |
| 8,209,601 B2 | 6/2012 | Bever et al. |

(Continued)

OTHER PUBLICATIONS

U.S. Appl. No. 10/597,519, Angel Palacios.
Andrew Radford, Syntactic theory and the structure of English, 1997, p. 124, Cambridge University Press, Cambridge, UK.

*Primary Examiner* — Robert J Utama

(57) ABSTRACT

The present invention provides assistance for a person to better comprehend the samples of a target language and, simultaneously, it facilitates that the person learns that language better. In order to do that, some special perspectives on those language samples are provided, and those perspectives show in a simple form the internal structure of said samples. All this will facilitate the person the assimilation of the structure and meaning of those language samples.

The invention is based on two facts. First, linguistic research has show that language comprehension depends on the assimilation of the internal structure of the messages that are received. Second, language learning require the learner to comprehend messages of that language in order to be able to develop the competence to associate meaning and form.

21 Claims, 4 Drawing Sheets

(a) The user selects "at"

| *The man* | finished his sandwich | |
| *at the bar* with the jacket | | before the bar closed |
| | on his shoulder | |

(b) The user selects "jacket"

| *The man* | finished his sandwich | |
| at the bar *with the jacket* | | before the bar closed |
| | *on his shoulder* | |

(c) The user selects "before"

| *The man* | *finished his sandwich* | |
| at the bar with the jacket | | *before the bar closed* |
| | on his shoulder | |

(56) References Cited

U.S. PATENT DOCUMENTS

| | | |
|---|---|---|
| 8,408,913 B2 | 4/2013 | Palacios |
| 2002/0150869 A1* | 10/2002 | Shpiro .......................... 434/156 |
| 2003/0203343 A1* | 10/2003 | Milner ......................... 434/157 |
| 2003/0228559 A1* | 12/2003 | Hajjar et al. ................. 434/169 |
| 2003/0232312 A1* | 12/2003 | Newsom et al. ............. 434/157 |
| 2005/0058972 A1* | 3/2005 | McDole ........................ 434/156 |
| 2005/0142521 A1* | 6/2005 | Chen ............................ 434/156 |
| 2007/0082324 A1* | 4/2007 | Johnson et al. .............. 434/156 |

* cited by examiner

FIGURE 1

(a) The user selects "at"

| The man | | finished his sandwich | |
|---|---|---|---|
| | *at the bar* with the jacket | | before the bar closed |
| | | on his shoulder | |

(b) The user selects "jacket"

| The man | | finished his sandwich | |
|---|---|---|---|
| | at the bar *with the jacket* | | before the bar closed |
| | | *on his shoulder* | |

(c) The user selects "before"

| The man | | *finished his sandwich* | |
|---|---|---|---|
| | at the bar with the jacket | | *before the bar closed* |
| | | on his shoulder | |

FIGURE 2

(a) The user selects "at"

| The man *at the bar* with the jacket on his shoulder finished his sandwich before the bar closed |
|---|

(b) The user selects "jacket"

| The man at the bar *with the jacket on his shoulder* finished his sandwich before the bar closed |
|---|

FIGURE 3

| PHRASE | LINK | REPLACING WORD | CLARIFICATION 1 | CLARIFICATION 2 | CLARIFICATION 3 | CLARIFICATION 4 |
|---|---|---|---|---|---|---|
| John went to the store after Mary turned on the radio that she had bought the previous week. | - | | John went to the store after XYZ1 | | | John "go" to the store after XYZ1 |
| after Mary turned on the radio that she had bought the previous week. | after | XYZ1 | Mary turned on the radio that VWZ1. | María turned on THE RADIO | | Mary "turn on" the radio that VWZ1. |
| radio that she had bought the previous week. | that | VWZ1 | she had bought the previous week. | | Ella had bought THE RADIO the previous week. | She "buy" THE RADIO the previous week. |

FIGURE 6

(a) The user selects "his"

| The man at the bar with the jacket <u>on his shoulder</u> finished his sandwich before the bar closed |
|---|

(b) The user expands the phrase "on his shoulder"

| The man at the bar with the jacket | finished his sandwich before the bar closed |
|---|---|
| <u>on his shoulder</u> | |

(c) The user selects the phrase "with the jacket on his shoulder" and expands it.

| The man at the bar | finished his sandwich before the bar closed |
|---|---|
| <u>with the jacket</u> | |
| <u>on his shoulder</u> | |

(d) The user selects the phrase "on his shoulder" and collapses it.

| The man at the bar | finished his sandwich before the bar closed |
|---|---|
| <u>with the jacket on his shoulder</u> | |

SYSTEM, METHOD, COMPUTER PROGRAM AND DATA STRUCTURE WHICH ARE USED TO FACILITATE LANGUAGE UNDERSTANDING AND/OR LANGUAGE LEARNING

TECHNICAL AREA

The current invention belongs to the area of systems to aid the comprehension of languages and/or the learning of languages in general, and foreign languages in particular.

PRIOR ART

References Cited in this Patent Application

The main references to the prior art are the following ones:
[1] Ahmed, M. (2001): Phrase Structure Analysis and Design Implication for CALL: A Case Study of the Bangladesh ESL Learning Situation, "AI-ED 2001 Workshop on CALL: Implementing Intelligent Language Tutoring Systems", May 20, San Antonio.
[2] Ahmed, M. (2002): A Note on Phrase Structure Analysis and Design Implication for ICALL, "Computer Assisted Language Learning", Vol. 15, No. 4, pp. 423-433.
[3] And: "AND Active English". English multimedia course.
[4] Baker, M. C. (2001): "The Atoms of Language", Basic Books, New York.
[5] Barriere, C., Duquette, L. (2002): Cognitive-Based Model for the Development of a Reading Tool in FSL, "Computer Assisted Language Learning", Vol. 15, No. 5, pp. 469-481.
[6] Boysson-Bardies, B. (2001): "How Language Comes to Children", The MIT Press, Cambridge.
[7] Christophe, A., Gout, A., Peperkamp, S., Morgan, J. (2003): Discovering Words in the Continuous Speech Stream: the Role of Prosody, "Journal of Phonetics", 31, p. 585-598.
[8] Davis, D. D. (2002): "El Don de la Dislexia" (The gift of dislexia), Editex, Madrid, 2000
[9] De Praatkist: Een intercultureel pakket voor het leren van mondeling Nederlands (The Speaking Kit: An intercultural course for the acquisition of oral Dutch). Den Bosch, Netherlands: Malmberg.
[10] Doughty, C. (1991): Second Language Instruction Does Make a Difference, "Studies on Second Language Acquisition", 13, pp. 431-469.
[11] Dr. LANG group: "LANGMaster Courses" English multimedia course.
[12] Fodor, J. D. (2000): Comprehending Sentence Structure, in "An Invitation to Cognitive Science, Language, Volume 1", Gleitman, L. R., Liberman, M. (eds), The MIT Press, Cambridge, Mass.
[13] Gross A., Wolff, D. (2001): A Multimedia tool to Develop Learner Autonomy. "Computer Assisted Language Learning", Vol 14, No. 3-4, pp. 233-249.
[14] Haegeman, L. (1999): "Introduction to Government and Binding Theory", Blackwell.
[15] Hagoort, P., Brown, C., Groothusen, J. (1993): The Syntactic Positive Shift (SPS) as an ERP Measure of Syntactic Processing, "Language and Cognitive Processes", 8 (4), pp. 439-483.
[16] Hahne, A., Friederici, A. (1999): Electrophisiological Evidence for Two Steps in Syntactic Analysis: Early Automatic and Late Controlled Processes, "Journal of Cognitive Neuroscience", 11(2), pp. 194-205.
[17] Jackendoff, R. (2002): "Foundations of Language", Oxford University Press, Oxford.
[18] Kim, K. H. S., Relkin, N. R., Lee, K., Hirsch, J. (1997): Distinct cortical areas associated with native and second languages, "Nature", 388, 10 July.
[19] Lasnik, H. (2000): The Forms of Sentences, in "An Invitation to Cognitive Science, Language, Volume 1", Gleitman, L. R., Liberman, M. (eds), The MIT Press, Cambridge, Mass.
[20] Leow, R. P., (1993): To Simplify or not to Simplify, "Studies in Second Language Acquisition", n.15, pp. 333-355.
[21] Nieto, A., SantaCruz, R., Hernandez, S., Camacho-Rosales, J., Barroso, J. (1999): Hemispheric Asymmetry in Lexical Decisions: The Effects of Grammatical Class and Imageability, "Brain and Language", 70, 421-436.
[22] Oh, S. (2001): Two Types of Input Modification and EFL Reading Comprehension: Simplification Versus Elaboration, Tesol Quarterly, Vol. 35, No. 1, Primavera 2001.
[23] Ouhalla, J. (1999): "Introducing Transformational Grammar", Arnold.
[24] Partee, B. H. (2000): Lexical Semantics and Compositionality, in "An Invitation to Cognitive Science, Language, Volumen 1", Gleitman, L. R., Liberman, M. (eds), The MIT Press, Cambridge, Mass.
[25] Pinker, S. (1999): "Words and Rules", London: Weidenfeld & Nicholson.
[26] Posner, M. I., Raichle, M. E. (1999): "Images of Mind", Scientific American Library.
[27] Quilis, A., Fernandez, J. (1975): "Curso de fonética y fonología españolas: para estudiantes angloamericanos" (Course on spanish phonetics and phonology for English and American students", CSIC.
[28] Radford, A. (1990): "Syntactic Theory and the Acquisition of English Syntax", Basil Blackwell.
[29] Radford, A. (1999): "Syntactic Theory and the Structure of English", Cambridge University Press, Cambridge.
[30] RBA Revistas: "Speak up". English multimedia course.
[31] Streb, J., Rosier, F., Hennighausen, E. (1999): Event-related responses to pronoun and proper name anaphors in parallel and nonparallel discourse structures, "Brain and Language", 70, pp. 273-286.
[32] Transparent Language. "Learn Italian Now". Italizn multimedia course.
[33] VanPatten, B. (1996): "Input Processing and Grammar Instruction", Ablex Publishing Corporation, Norwood, N.J.
[34] Yano, Y., Long, M. H., Ross, S. (1994): The Effects of Simplified and Elaborated Texts on Foreign Language Reading Comprehension, "Language Learning", 44:2, June, pp. 189-219.

Scientific research during the last decades has shed much light on how language works and on the brain processes that underlay it. During the last years in particular the technical character of the research on language has exploded. Many technical and scientific resources are being used to understand the brain processes that are related to the learning of second languages. Underlying this approaches is the idea that the way language works in the brain shares many features with the way other organs work, and that a technical and scientific approach to the processes that take place will allow to develop better systems that have not been possible thus far for learning languages and for correcting defects in the learned language.

For example, experiments are being undertaken that use electro encephalograms, functional magnetic resonance imaging, positron emission tomography, and magneto encephalograms. These experiments have shown that concepts such as "verb", "sentence", "semantics" and so on are associated to sophisticated electrophysiological processes. For example, some of those experiments have shown that the brain builds the inflexion part of verbs using two different brain areas, depending on whether it is a regular or an irregular verb [Pinker, 1999].

In some of these experiments, the scientists measure the evoked potentials. Evoked potentials are variations on the measured electromagnetic field which are produced by the brain when a subject is processing samples of language which have certain characteristics. It has been shown that the evoked potentials are different when the subject finds a syntactic anomaly than when the subject finds a semantic anomaly. This provides evidence that the electrophysiological response coming from syntactic processing is different from that one coming from semantic processing [Hagoort et al, 1993].

In other experiments, Hahne and Friederici describe evidences that the brain develops the structural analysis of sentences in two steps. The first step is applied to all language samples in an automatic fashion, and the second one is applied in a controlled way with an intensity that depends on the complexity of the language sample [Hahne and Friederici, 1999].

Streb and colleagues have shown that the electrophysiological processes of the brain depend on the grammatical categories that are being processed. In order to do that, they studied the processes that are developed to recover a proper noun from two different references: a pronoun or the same proper noun [Streb et al, 1999].

Nieto and colleagues have also shown that the brain processes that correspond to different grammatical categories are different. In particular, they have shown it for verbs and nouns [Nieto et al, 1999].

These and other evidences have led many scientists to consider that the brain has a "language organ", i.e. a part of it that is specifically devoted to processing language. Understanding the technical characteristics of the processes that the brain uses to process language will lead to the development of better systems for language learning.

In relation in particular with second language learning, Kim and colleagues used functional magnetic resonance images in 1997 to show that persons that have learned a second language in adulthood use different areas of the brain than persons that had learned the second language during childhood [Kim et a 1, 1997].

It seems reasonable to assume that those persons that use a different part of the brain for speaking the second language than for speaking the first language are using general cognitive brain resources, instead of specific language resources. And that they are using those brain resources that are used to solve general problems, such as solving a crossword, an equation, or a text evaluation.

This possibility is supported by the phenomenon known as "cognitive deficit", which is a decrease in the ability to perform general activities in a language that is not well known. The origin of the cognitive deficit is probably the competition that takes place between the mental process that manages the second language and the mental process devoted to the general activity that is being performed, given that both processes might be using the same mental resources at the same time.

A variable that was not taken into account in Kim's experiment was how the subjects had learned the second language for those subjects that had learned it in adulthood. In fact, there are some cases of adult learners that manage to achieve a command of the second language that is virtually indistinguishable from that of native speakers, despite having learned it late. It is reasonable to assume that these people have somehow manage to use the second language with the mental resources specifically devoted to language.

In line with the previous paragraph, in the area of second language learning the ultimate goal should be to achieve as good a command as possible of the second language, and this would lead us to develop methodologies that would allow the learner to produce an electrophysiological response to language input equal to that of native speakers. It is reasonable to think that the way in which the second language is learned will condition the way in which brain resources will be used.

In fact, the way in which an activity is developed influences the way in which brain resources are used, as Possner and Raichle show [Possner et al, 1999, p. 129]. These authors describe how the brain map that is produced during performing a verbal production task varies depending on whether the subject has had enough practice previously, despite externally the activity seems to be the same in both cases.

The issue then is how could a second language be learned in such a way that people use the language specific brain resources instead of the general cognitive resources.

In general, most of the second language learners devote long hours to analyzing sentences word by word, often translating words. There is some logic to this approach, given that learning a language requires the comprehension of messages created in that language. The problem is that, if general cognitive resources are being used, such as analysis and translation, the language will be approached using general cognitive resources.

The problem that exists when trying to understand messages in a language that is being learned is that, in order for those messages to be useful for the learner, they must contain linguistic forms that must be more complex that what the learner already knows. If this did not happen, the learner would not have the opportunity to learn new linguistic aspects [Yano 1994]. In this situation, the environment must provide the learner with the opportunity to interact in order to get clues or hints that allow the learner to infer what those messages mean. Learners must somehow have access to what the sentences they are listening mean [Baker 2001, p. 224].

What is necessary, then, is a system that facilitates the comprehension of samples of the second language without the learner having to resort to cognitive analytical efforts, and it is also necessary that that system can also be applied to all kinds of texts.

Such a system would be specially useful for learning second languages, because it would allow learners to work with authentic texts. Authentic texts are samples of language that have been generated to satisfy some communicative or informative need in the community in which that language is the native language. Second language teachers consider that authentic texts are specially useful for learning second languages, and the reason why they do not use them more often is that they do not have systems that allow learners to understand them.

As far as has been reviewed in the prior art, there are not references that solve the current need for systems that facilitate the comprehension of messages in a language that is being learned. In the next lines a general view is provided of the more significant references that have been found.

[Gross, 2001] proposes a system to assist learners to better comprehend foreign texts. The main problem is that the part related to sentence comprehension is not defined yet.

[Barriere et al 2002] has a similar goal as [Gross et al 2001]. The problem is that, as is the case with [Gross, 2001], this reference mainly describes a working plan, more than concrete results.

[Yano et al 1994] y [Oh 2001] are two references that describe experiments that are based on modified versions. The main problem with this references is that modified versions by themselves solve the comprehension problem only partially. Additionally, what they really do is to replace authentic texts with modified versions that are easier to understand.

[De Praatkist] describes an approach in which several simplified versions are created. This reference describes a pedagogical approach that is currently being used. The main problem is similar to the problems of [Yano et al 1994] and [Oh 2001], and it is that simplified versions do not completely solve the problem.

[Transparent Language], [And] and [Dr. LANG group] are a representative sample of commercial products that provide annotated foreign language samples. Their main problem is that they only provide translations to facilitate comprehension. That allows to comprehend the language samples, but it does not allow to assimilate the linguistic form of those samples, so that it is not possible to associate form and content.

[Doughty, 1991] is an experiment set up to test whether text comprehension facilitates language learning. They use certain paraphrases and an animation program that illustrates the grammatical rules that are applied for relative clauses. The main problem of this reference is that the means used to facilitate comprehension is based on explaining grammar. Also, it is only applied to simple relative clauses, and it does not explain how it can be extended to other types of sentences and to more complex sentences, such as those that are used during normal language use.

The reference [Ahmed 2002] (and [Ahmed 2001], given that they basically have the same content) proposes a system for teaching rules for building phrases. The limitation of this reference is that its goal is to teach grammatical rules, rather than facilitating comprehension. Additionally, the utilization of the phrase tree usually present comprehension problems.

The general evaluation of the prior art is that we are in need of systems that facilitate the comprehension of foreign languages. Even though this need has been felt for a long time, there have not yet appeared systems that can effectively solve it.

The appearance of the personal computer generated high expectations in the field of second language learning. It was thought that technology linked with pedagogy would provide resources that did not exist yet.

However, the general perception of the field is that, despite those great hopes, and despite the fast expansion of informatics tools in the fields of teaching and comprehension of languages, the final results have been very limited.

Barriere y Duquette, for example, believe that only limited benefits have been achieved with the utilization of automatic tools for facilitating learning [Barriere et al 2002]. The same authors cite other references in which only low learning gains were achieved.

In conclusion, language comprehension and language learning is a vital need in the current global society, and nevertheless there are not systems nor methods that can satisfactory solve this need.

The challenge, then, is to develop systems and methods that facilitate comprehension, but this is an issue that has not been solved yet. A way to approach this question is through the following three key aspects:
1. Scientific knowledge about language.
2. Technological experiments that are being undertaken on language.
3. Technical resources that are provided by informatics.

DESCRIPTION OF THE INVENTION

Introduction

The present invention is a means for facilitating language comprehension and learning, and it responds to the perceived need for betters systems for aiding in comprehension and learning of language. It is mainly based on two aspects:
1. The existing scientific knowledge about how the brain processes language.
2. The utilization of computer technology to perform several techniques that have been designed based on the previous aspect.

Modern science has shown that, in order to understand a message, it is necessary to assimilate the internal structure of the sentences that the message contains. References [Jackendoff 2002, p. 10], [Lasnik 2000], [Radford 1999 p. 14], [Haegeman 1999 p. 138] and [Partee 2000] explain in detail the characteristics that such structure has. The structure of language is not a mere academic creation, but it is related to the electrophysiological processes that take place in the brain, and it is intimately related also with the variations in frequency, intensity and length of the sounds that make up language. As a person perceives a sentence, his/her mind automatically recreates that sentence's structure, performing during that process very complex operations.

[Fodor 2000] describes some of these operations. This reference shows how the response times after certain word recognition activities are different in different points of the sentence, as a result of the process that builds the structure of the sentence following certain rules of modern linguistic theory.

An example, adapted from [Fodor 2000], and shown in Exhibit 1 in this description, allows to realize the importance that assimilating sentences' structure has in order to comprehend their meanings. The sentence in the example is difficult to understand, even for native speakers of the language in which it is written (which in this case is English). The difficulty to understand it is not due to sophisticated or ambiguous structures, but to the particular form the sentence has. It has too many embedded phrases, and processing them requires too much computational load. Later on in this description it will be shown how the present invention facilitates the assimilation of the sentence's structure and therefore the comprehension of its meaning.

Exhibit 1.

The mouse the cat the dog scared chased jumped over the wall.

In order to identify the structure of messages which are received in spoken language, people use the variations in frequency, intensity and length of sounds i.e. the intonation that they perceive [Quilis et al 1975], [Boysson-Bardies, 2001], y [Christophe et al, 2003]. Such variations allow for the listener to assimilate the structure of the sentence, and therefore to understand the sentence.

Jackendoff believes that the importance of intonation is such that there are certain structures that are not perceived as grammatically correct because the variations that they demand in terms of frequency, intensity and length do not satisfy certain general requirements imposed by intonation [Jackendoff 2002].

The comprehension of structure and variations of frequency, intensity and length are also essential for children to acquire language. It has been seen that such variations provide very important clues for children to assimilate the structure of language and therefore to learn it. For example, it has been shown that very young infants who still do not understand language are able to detect the borders of phrases through the perception of variations in intensity, fundamental frequency and length of the language samples they listened to [Boysson-Bardies, 2001].

In written language, people cannot use intonation, and they resort to their own knowledge of language in order to choose which structure, among the possible structures, is the appropriate one for the message they are perceiving. There exists a phenomenon, called "garden path", that shows how processing written language is different from processing spoken language, and that it has some limitations. For example, when reading the sentence "The horse raced across the barn fell", a normal speaker will notice that when he reaches the word "fell" his interpretation of the sentence is not correct.

The first interpretation is that "raced" is the main verb of the sentence, but in the correct interpretation the main verb is "fell", given that the sentence is equivalent to "The horse that was raced across the barn fell".

This problem does not exist when the sentence is perceived aurally, given that the sentence's intonation communicates the structure of the sentence, and that information eliminates any ambiguity. While reading a written text, the reader initially assumes that sentences have a given structure, and changes it incrementally so that the information that he is reading makes sense. Somehow, the reader subconsciously feels the intonation that would be associated to the text that he is reading. The reader perceives that two different interpretations create different subconscious feelings about intonation.

The learner of a foreign language is in disadvantage both in spoken and written language. In spoken language, he does not have enough knowledge about that language's characteristic intonation patterns. In written language, he does not have the capacity what possible structures might exist for a written language sample.

The present invention approaches the process of language comprehension through perception and assimilation of language's structure. In order to do that, the learner will interact with different language samples, and these interactions will provide different views about the language samples that will clarify its structure. In this invention, each of this views is called PERSPECTIVE.

The invention allows the learner to easily understand the structure and meaning of language samples without needing to make much use of the general cognitive resources, given that utilizing those general resources would prevent the utilization of the specific resources that the brain uses for language.

The invention can be applied both to learning a second language or to learning a native language for people that have some problem with the native language. Dyslexic people, for example, seem to have problems which are similar to the problems of learners of foreign languages in the understanding of functional words [Davis 2002], [VanPatten 1996] (functional words are those whose purpose is not to provide a meaning in itself—such as "dog"—but to somehow contribute to the global processing of the sentence.

The issue now is how to facilitate for the person that does not have a good command of a given language to understand the structure of that language. The issue is how to replace all the information that is provided by the variations of frequency, intensity and duration, and that is subconsciously recreated during reading.

All this is possible thanks to the means that are provided by computer technology. Without computers, it would be very difficult to implement the processes of the present invention.

Despite a system such as the current invention is very necessary, no similar system exists today.

The following paragraphs describe a number of concepts and techniques that are included in the invention. It is understood that it is not strictly necessary that all of them are implemented simultaneously.

Preparation of the Language Samples

In order for the learner to use the invention, it is necessary that the language samples are prepared, so that they contain certain information that will allow to show their structure. This preparation can be done automatically, utilizing tools from computational linguistics, manually, or in a mixed fashion, combining some processing performed by automatic tools and a revision performed by a human tutor. The utilization of tools from computational linguistics is not included in this invention, and they are not a limiting factor for the scope of the invention and the patent.

In general, the language samples will be divided in smaller fragments, and the identification of the structure will be performed over those fragments. As will later be explained, in the preferred embodiment such fragments are sentences, but they could have other nature without affecting the scope of the invention. The criterion used to divide the language samples will not limit the scope of the invention.

In order to show the structure of the language samples, that structure must first be identified. The structure will depend on what type of syntax is chosen, but in general it will lead to the identification of several groups of words, the relation among those groups defining the structure of the language samples. In general, these word groups will be phrases.

In order to facilitate the learner to understand the structure, it is important to use as few phrases as possible, so that they do not create confusion. The decision on which phrases to choose will depend on the actual embodiment of the invention. In the section where the preferred embodiment is described, there is an explanation about what phrases will be chosen in the preferred embodiment. In general, in this patent application, the term "chosen phrases" will be used in order to refer to the phrases that will be taken into consideration when defining the structure of the language samples.

Chosen phrases can be divided into two groups:

1. Clause phrases: these are those phrases that are clauses, and will in general be complementizer phrases, inflexion phrases, and verbal phrases, in case those phrases exist in the language sample.

Note: In English, a clause is a group of words where there is a verb (which might be implied). A sentence is an independent clause, i.e. a clause that is not included into any larger expression. In other languages, such as Spanish, there is not a term for "clause" and both sentences and clauses are referred to by the same term.

2. Basic phrases: these are all the other phrases, such as nominal phrases, determinant phrases and so on.

As is generally done in linguistics, the structure of a text fragment is codified using delimiter characters, such as brackets. In this patent application, a language sample in which delimiter characters have been inserted in order to define its structure will be called separated sentence, separated text, or separated fragment.

Exhibit 2 shows a separated sentence for an example text: Exhibit 2.

[[The man [at the bar]][with the jacket [on his shoulder]]]] finished his sandwich [before the bar closed.]]

In general, phrases in Linguistics are arranged in a tree fashion, with larger phrases containing smaller phrases. However, the invention is not tied to this type of arrangement. For example, a phrase structure might be conceived of in which the words of a phrase are separated by intermediate words, so that each word might belong to a different parent phrase. In these cases, the invention might still be used either by treating the separated words as different phrases or by limiting the functionality in some cases.

Depending on where phrases are located, they can be termed "internal" or "external". An internal phrase is surrounded by words on both sides. For example, in Exhibit 2, the phrase "at the bar" is an internal phrase, because it is between words "man" and "with". However, the phrase "before the bar closed" is an external phrase, because there are no words at the right of "closed".

The Escalator Tree

The ESCALATOR TREE is the main answer to the perceived need of a replacement for the information provided by the variations in frequency, intensity and duration in order to indicate the structure of the language samples. In the escalator tree, the words are laid in different levels, as in an escalator, as is shown in Exhibit 3 for the sentence that was shown in Exhibit 1.

Exhibit 3.

| The mouse | | jumped over the wall. |
|---|---|---|
| | the gat | chased. |
| | the dog scared | |

Depending on how the levels are assigned for the different words, there will exist different types of escalator trees, and they will facilitate comprehension in different degrees. In the example, the transitions downwards open new fragments, and the transitions upwards close them.

As can be seen in Exhibit 3, the main characteristic of the escalator tree is that some words are placed in a vertical position that is different from the vertical position that they would have if the text had been arranged in a standard word-by-word and line-by-line text. The vertical position that a word would have occupied in a standard text arrangement is termed in this invention "the standard vertical position".

Modifying the vertical position as described, can be applied both to internal phrases and to external phrases.

When assigning the level to each word, it is readily obvious that the level could be 'negative', i.e. that word would be placed above their standard vertical position. However, this arrangement would be more difficult to understand than if the words are placed below their standard vertical position.

In order to read an escalator tree that has used a level assignment criteria such as in Exhibit 3, the reader must progress in horizontal direction, changing the level in vertical direction every time a new word is reached that is not at the same level. Every time a transition downwards is done, the reader is entering into a text fragment that remarks or points out something that has to do with the previous fragment. In the case of transitions upwards, the effect is the opposite, i.e. the remark or particularization is finished and the reader returns to the domain of the previous text fragment. (Sometimes this is not exactly so. For examples, subordinate clauses sometimes are before their main clauses, and in head final languages, such as Japanese, this happens most of the time)

In Exhibit 3 it can be seen that reading the first row in horizontal direction the reader obtains "The mouse jumped over the wall". If the second row is read after the transition that exists between "mouse" and "the", the reader obtains "the cat chased", which clarifies what mouse is being referred to. If the third row is read after the transition that there is between "cat" and "the" the reader obtains "the dog scared", which clarifies what cat is being referred to.

As can be seen, now it is possible to understand the meaning of the sentence. Furthermore, now it can be even read, either aloud or silently, because the reader has information about its structure, and can generate, even though with effort, the variations of frequency, intensity and duration of the sounds that correspond to its structure. If the sentence is recorded and listened to, even though it is still difficult to understand it perfectly, part of it at least can now be understood.

Graphical means can be used in order to further increase the ease of comprehension, such as horizontal lines, different colors or formats, etc.

An important issue is what criteria to use in order to assign the levels to the words in the escalator tree. This depends on the actual embodiment that will be carried out, as will explained in the description of the preferred embodiment. In general, when assigning levels to the different parts of the sentence, the goal is to make the most important parts of the sentence as salient as possible. Acting this way, it will happen that the level that corresponds to each fragment of the sentence will be independent of its level of embedding. Later on in this document, FIG. 5 and Exhibit 12 will show how in a possible text string, the components of the string can have an embedding level different from the level they have in the escalator tree.

General Management of Phrases

The first way to aid the learner is to help him to easily identify the different components of a fragment. In order to do that, the invention contains a number of techniques.

The SELECTION OF MINIMAL CHOSEN PHRASE is a technique that helps the user-learner to easily identify the phrases that make up the sentence. When the user selects a given position in the sentence, the system will identify the minimal chosen phrase of that word, and will mark it in a given format. The minimal chosen phrase of a position is the chosen phrase that includes that position and which does not include any other phrase.

For example, for the sentence in Exhibit 2, if the learner would select "shoulder", the invention could show what appears in Exhibit 4a. The result is that the user would easily see that those three words must be jointly considered.

Exhibit 4a.

The man at the bar with the jacket on his shoulder finished his sandwich before the bar closed.

Additionally, the chosen phrases that are ancestors to the minimal chosen phrase can be marked with a special format that is different from the format used for the selected chosen phrase, as is shown in the Exhibit 4b for the same example. This will facilitate for the learner to perceive the context in which the selected chosen phrase is being used.

Exhibit 4b

The man at the bar with the jacket on his shoulder finished his sandwich before the bar closed.

The ASCENSION OF CHOSEN PHRASES is a functionality that changes the chosen phrase that is selected at a given moment, so that the new selected chosen phrase will be the parent of the current selected chosen phrase. For example, if this functionality is applied to the example in Exhibit 4b, the result would be the text that is shown in Exhibit 4c. This functionality allows the learner to easily interact with the text and explore its structure, thanks to the means provided by computer technology.

Exhibit 4c.

The man at the bar with the jacket-on his shoulder finished his sandwich before the bar closed.

In order to further facilitate the learner's activities, some embodiments of the invention allow to enable and disable the chosen phrases. When a chosen phrase is disabled, the invention will act as if that phrase does not exist. A way to get the learner's attention focused to the appropriate parts is to disable the basic chosen phrases. The justification is that in the hierarchical processing that the brain performs, clause phrases are more relevant than basic phrases. In these circumstances, the invention would only show those phrases that come from clauses (either subordinated or coordinated clauses). Once the learner is able to understand this level, he could enable all the phrases and focus his attention to understand the details that are provided by basic phrases.

The techniques which have been described in this section can be applied in all the perspectives in which the structure of the language samples is shown.

For instance, FIG. 1 shows an example of an escalator tree, in which different chosen phrases have been shown after the different selections have been done by the learner. Also, certain words have been marked in order to better show the borders of the different phrases. FIG. 2 shows the same sentence without escalator tree, in order to better illustrate the effect that the escalator tree has on the perception of the sentence structure.

After FIG. 1 and FIG. 2, it can be seen that other perspectives are possible too, in which some phrases are "moved" and some other phrases are not moved. In fact, if some phrases are disabled, they would not be taken into account, and therefore they would not be moved.

The side effect of disabling phrases is that they would not be selected either in cases such as those in Exhibit 4a, 4b, and 4c.

An intermediate case is possible by applying the concepts of "expanding" and "collapsing" used in tree structures.

In FIG. 6, in step (a) the user selects his. Then in step (b) he/she expands the phrase, so that it "moves" down. In step (c) he/she does the same thing with the parent phrase "with the jacket on his shoulder", so the whole phrase moves down.

In Step (d) the user does the reverse action, which is collapsing. He/she selects "on his shoulder", and collapses it, so it moves up.

It can be seen that expanding and collapsing is simply applying the invention to particular phrases, and not to others, so that the user can focus on those phrases that are more difficult to understand.

This is important for language learning, because the user can discover by himself/herself the structure of the sentence, rather than having the full structure shown directly. Even though it would require more work on the side of the user, this usually produces higher learning.

Projection Substitution

PROJECTION SUBSTITUTION is a technique whose goal is to further facilitate for the learner to assimilate the structure of the language samples. It words by replacing phrases or word groups by other simpler words that will allow the learner to selectively focus on different parts of the sentence.

For instance, the phrase "the man who is the brother of the woman in red" can be generally replaced by "the man" or by "man". This is a general principle in linguistics, and in this invention it is extended to other cases, such a is explained later on, in order to provide assistance to the language learner.

This technique is based on two linguistic concepts: the projection principle and the criterion of constituent replacement, both of them explained in [Radford 1999], [Ouhalla 1999], [Haegeman 1999].

An example will be shown now about how this can be applied in the invention, for the example fragment "John went to the store after Mary turned on the radio that she had both the previous week":
1. Replace the phrase "Mary turned on the radio that she had bought the previous week" by XYZ1, which yields "John went to the store after XYZ1"
2. Replace the phrase "she had bought the previous week" by XYZ2, which yields "John went to the store after Mary turned on the radio that XYZ2"

Instead of using invented text strings, such as "XYZ2", words that exist in the language can also be used. The projection principle and the criterion of constituent replacement ensure that this can always be done. For example, instead of writing "John went to the store after XYZ1" it could be possible to write "John went to the store after that"

The main advantage in using existent real words is that it is possible to aurally playback the text. However, there are two important disadvantages:
1. Often, what happens is that the sentences that are produced by this method are not sentences that are commonly used, even though they might be grammatically correct, and this can negatively influence the learning of the person.
2. Using real words for replacing word groups sometimes requires to use words that it would not be advisable to include. For the previous example, the sentence in Spanish would be "Juan fue a la tienda despues de eso", however, it might be better to use the sentence "Juan fue a la tienda despues de que eso", leaving "que" outside of the replacing word, but this sentence is not grammatically correct. In order to make it correct, the replacement should yield "Juan fue a la tienda despues de que eso pasara". In this invention, it is considered that it is better to have the freedom to leave the word "que" outside of the replaced words, because the replacing word has a closer equivalence to entities that are more easily perceivable. For example "XYZ1" is equivalent to the event "Mary turned on the radio", while "eso" is equivalent to "que Maria encender la radio", which is not so easily perceived as an event.

Another advantage of using words which are not real is that it is possible to use indices that allow the learner to easily navigate through the different text fragments associated to the sentence.

In this invention, and without limiting effects, he words that are used in order to replace projections are called REPLACING WORDS, independently of whether they are real existing words or non existing words.

In order to facilitate comprehension, different formats and different replacing words can be used for different types of phrases. For example, it might be possible to use words such as "OOOO1" to replace a relative phrase, such as "man who came for lunch", in "This is the man who came for lunch". The replacement would yield "This is OOOO1". This replacement could be combined with another replacement that might be "This is the man that XYZ1", and use both in combination.

Projection replacement is used complementarily with the EXPANSION OF REPLACING WORDS, which is a technique that is based on replacing back the replacing words by the text fragment they are associated with, which can also, in turn, contain other replacing words.

In order to use projection replacement and expansion of replacing words, it is necessary to user computer technology. Exhibit 5 shows the details about how this can be applied in the invention. The boxes in which the text samples are included could represent windows in a computer system. In a situation in which the learner is working on the sentence "John went to the store after Mary turned on the radio that she had bought the previous week", in a possible embodiment of the invention the following steps might be taken:
0. At the starting point, the system would show the original sentence, as is indicated in "Step 0". If the learner does not easily understand the sentence, in a possible embodiment of the invention, the invention would show the text in Step 1.
1. This text shows the basic structure of the sentence. With it, the learner can see what the basic structure of the sentence is. If the learner now wants to enhance his comprehension of the sentence, he can select the special word "XYZ1", in order to get into the structure of the sentence fragment that is included in it. The invention then expands that replacing word.

2. The text that is shown in Step 2 includes details of the first subordinated clause of the starting sentence. If the learner wants to keep getting into deeper levels of the sentence, he can now select the special word "XYZ2", and the invention would replace this special word by the text fragment that it represents, and the final sentence would be obtained, after having navigated into its structure.

Exhibit 5.

Step 0. The learner examines the initial sentence.
John when to the store after Mary turned on the radio that she had bought the previous week.

Step 1. The invention shows the basic structure of the sentence
John went to the store after XYZ1.

Step 2. The user-learner selects the special word "XYZ1", and the invention expands such special word.
John went to the store after Mary turned on the radio that XYZ2

Step 3. The user-learner selects the special word "XYZ2"
John went to the store after Mary turned on the radio that she had bought the previous week.

Projection replacement can be applied in all perspectives. For example, Exhibit 6 shows how it can be applied in the escalator tree.

| Exhibit 6. |
|---|
| John went to the store |
| after Mary turned on the radio |
| that XYX1. |

Utilization of Clarifications

In order to facilitate the comprehension of the different phrases that compose the text fragment that the user wants to understand, several concepts can be used. In order to facilitate the exposition, in what follows some of the concepts that are used in the preferred embodiment will be succinctly described. In the section that describes the preferred embodiment, detailed information about these concepts is shown.

1. Link. It refers to words that are used to introduce the phrase in the text fragment in which it is located, and in general is composed by prepositions, determinants, adverbial word groups, etc. Some chosen phrases have links and others do not.
2. Clarification 1. It is a paraphrase that exists for clause phrases that contain child phrases that, in turn are clause phrases. It is built by inserting replacing words instead of the immediate child clause phrases. For example, the Clarification 1 of "John went to the store after Mary turned on the radio" might be "John went to the store after XYZ1"
4. Clarification 2. This is a paraphrase that can be applied to the phrases that have a child that is a relative structure. For example, the clarification 2 of "John is the man that won the competition last year", it could be "John is THE MAN", or "John is OOO1"
5. Clarification 3. It is a paraphrase that can be applied to the phrases that are clause phrases and that are also themselves a relative structure, and it is created by rebuilding the relative clause, so that it has a normal order in the target language. For example, for the phrase "that won the competition last year", the Clarification 3 could be "Juan won the competition last year".
6. Clarification 4. It is a paraphrase that is applied to the phrases in which the verb is not in indicative form. It is the same as clarification 1, (or clarification 3 if it exists) but the verb is modified so show it in infinitive form. For example, for the Spanish clause "de que Maria encendiera la radio" the clarification 4 would be "Maria encender la radio".

In any of the clarifications it is possible to add words to re present omitted grammatical functions, such as subjects or verbs. These words could be shown within brackets, in order not to confuse the learner.

The Informative Tree

The INFORMATIVE TREE is a structure that further facilitates the understanding of the structure of the language samples. It is based on the TOWER TREE. Exhibit 7 shows the tower tree for the sentence "The man at the bar with the jacket on his shoulder finished his sandwich before the bar closed." As can be seen, the tower tree is the vertical arrangement of the different chosen phrases that exist in the text fragment, where each phrase can be optionally indented according to its embedding level.

EXHIBIT 7

| | |
|---|---|
| 1 | The man at the bar with the jacket on his shoulder finished his sandwich before the bar closed. |
| 2 | The man at the bar with the jacket on his shoulder |
| 3 | The man at the bar |
| 4 | at the bar |
| 5 | with the jacket on his shoulder |
| 6 | on his shoulder |
| 8 | before the bar closed |

The INFORMATIVE TREE facilitates the navigation through the phrases, replacing words and other aspects of the target language. For the learner, this helps to understand the samples of target language; for the tutor, it helps to prepare those samples.

FIG. 3 shows an example informative tree for the example sentence "John went to the store after Mary turned on the radio that she had bought the previous week". The purpose of FIG. 3 is to facilitate the exposition, and it does not have limiting effects. It is understood that other different types of informative trees with other structures could have been created.

As can be seen in the Figure, the informative tree is a tower tree to which some fields have been added in order to augment the information that is provided about the different chosen phrases of the language fragment on which the user is working. In particular, some clarifications, which have been previously described, have been added.

With this informative tree, the user could be interested in the basic structure of the first chosen phrase, and could see that its clarification 1 is "John went to the store after XYZ1". If now he is interested in completing its comprehension by inspecting in closer detail the replacing word "XYZ1" and the text it corresponds to, he can go to the row where the chosen phrase that corresponds to that replacing word is located, so that he can see the clarification 1 of this new chosen phrase, which is "Mary turned on the radio that VWZ1", and understand its structure and meaning. In the same row, he can now find more information, such as the clarification 2. If the sentence was in Spanish, it would be "Mary encendiera la radio que VWZ1". In this case, the learner might go to the clarification 4. The clarification 4, in particular, would indicate him that it is an event that is not "current time", meaning that the verb is not in indicative mode.

In order to facilitate the navigation in the informative tree, when the user selects a replacing word, such as "XYZ1", the system might mark the row of the phrase for which "XYZ1" is a replacing word.

In order to further enhance the navigability in the informative tree, when a chosen phrase is selected, the system can also mark somehow its children, generally using a special format or a special background color. Also, it could optionally have the option to open and close children.

In the examples that have been covered, the focus has been put only on clause phrases with the purpose of facilitating the exposition, but basic phrases could have also been used.

The informative tree of the tutor could have several differences respect to the tree of the user-learner. In particular, it could have added columns that might be used to show data that are not relevant for the learner.

Grammatical Perspective

In order to understand a sentence it is essential to identify its grammatical components. In order to do that, the speaker resorts to syntactic and semantic criteria. In some languages, such as Japanese, it even happens that the components can have a suffix that identifies them, as shown in Exhibit 8.

EXHIBIT 8

| John-ga | Mary-ni | hon-o | yatta |
|---|---|---|---|
| Juan-SU | Mary-IO | book-DO | gave |
| ("John gave a book to Mary") | | | |

Where SU stands for subject, IO for indirect object, and DO for direct object.

In order to help the learner to identify the grammatical components, the present invention uses the GRAMMATICAL PERSPECTIVE, which is characterized by exposing such grammatical components in an organized way. A possible embodiment, that corresponds to the preferred embodiment, uses a table and is shown in the Exhibit 9 to facilitate the exposition and without any limiting character.

EXHIBIT 9

| COL 1 | COL 2 | COL 3 |
|---|---|---|
| (Icon 1) | Topic | |
| (Icon 2) | Subject | John |
| (Icon 3) | Verb | has painted |
| (Icon 4) | Direct Object | a portrait |
| (Icon 5) | Indirect Object | |
| (Icon 6) | Time Adjunct | before XYZ1 |
| (Icon 7) | Place Adjunct | |
| (Icon 8) | Manner Adjunct | |
| (Icon 9) | Cause Adjunct | |
| (Icon 10) | End Adjunct | |
| (Icon 12) | Companionship Adjunct | |
| (Icon 13) | Beneficiary Adjunct | for Sarah |
| (Icon 14) | Attribute | |
| (Icon 15) | Agent in passives | |

The purpose of Exhibit 9 is to facilitate the exposition; it is understood that the number of grammatical components that are chosen might be different from those shown in the Exhibit. Similarly, in other embodiments, the previous table might have other different characteristics. For example, the data could be shown in a horizontal table. Also, the order could be different, in order to show an order that might be similar to the basic order of the target language. Also, the cells that correspond to the grammatical components that do not exist in the sentence could be hidden.

The table might optionally have some additional characteristics, such as showing the name of the grammatical function that corresponds to each part of the table. It is also possible to insert symbols or nicknames for each grammatical component which will allow to identify them quickly and intuitively.

Furthermore, the table can optionally be enriched with some other functionality that is described in the following paragraphs. The first one would be inserting similar sentences, as shown in Exhibit 10, which is characterized by the possibility to add new columns or rows and show other example sentences, which can be known to the user, which contain similar grammatical components. The purpose of this technique is to take advantage of the fact that right after the mind has processed a given linguistic stimulus (the stimulus being either syntactic construction or a word), the mind has a certain tendency to facilitate the processing of other similar stimulus. This phenomenon is often used in techniques known as "priming", whose goal is to explore how the mind associates linguistic stimulus.

EXHIBIT 10

| COL 1 | COL 2 | COL 3 | COL 4 | COL 5 |
|---|---|---|---|---|
| (Icon 2) | Subject | John | Louis | Joseph |
| (Icon 3) | Verb | has painted | has written | has built |
| (Icon 4) | Direct Object | a portrait | a book | a house |
| (Icon 6) | Time Adjunct | before XYZ1 | | |
| (Icon 13) | Beneficiary Adjunct | for Sara | for Mary | for Robert |

Advantages of the Invention Over the Prior Art

As has been seen, the invention is based on facilitating comprehension of the structure of target language samples. In order to do that, the learner interacts with the system, and as a result several perspectives are generated of the language sample on which the user is working at each moment.

The main advantage of the invention is that it solves the problem of how to facilitate that the learner comprehends samples of the target language that have higher complexity than the knowledge that the learner has at that moment. This problem was not solved until know. As far as has been known, no similar approach to languages learning has been found.

The most important aspects of the invention are the following ones:
  It presents a number of perspectives that clarify the structure of the language fragments on which the learner is working.
  With the escalator tree, it provides the learner with relevant information about the structure of the text that is very similar to the information that is provided by the variations of frequency, intensity and durations of sounds.
  With the projection substitution, it allows to access the structure of all the subordinated clauses that exists in compounded sentences. This problem, up to this moment, had not been solved.

In summary, for the learner, the invention presents a highly systematized method to present the structure of target language samples, which should in turn facilitate the comprehension. For the tutor, the invention includes a highly systematical method for preparing the samples of target language, which should facilitate his tasks.

DESCRIPTION OF THE FIGURES

FIG. 1 shows an escalator tree.

FIG. 2 shows a sentence in which different types of phrases have been selected.

FIG. 3 shows an informative tree.

FIG. 6 shows how to expand and collapse phrases.

EXPOSITION OF THE PREFERRED EMBODIMENT

Introduction

In the preferred embodiment, the different perspectives are shows in different interaction windows, these interaction windows being areas of the screen of a computerized system.

Figure 4:
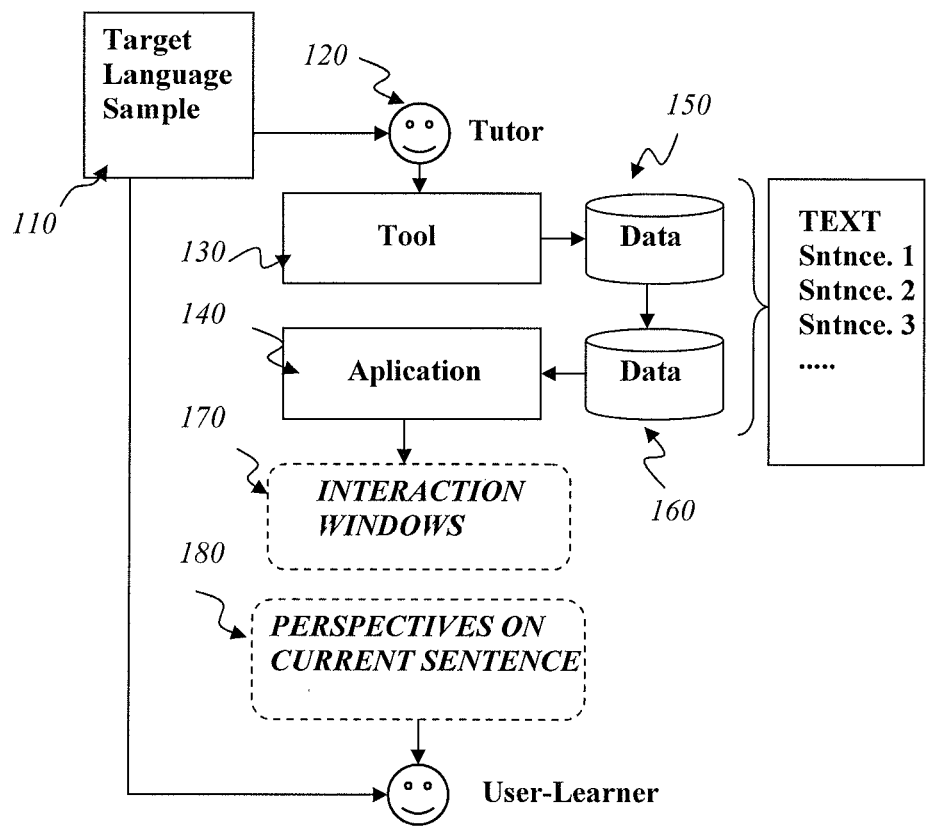
FIG. 4 shows a general scheme of the invention.

FIG. 4 schematically shows the general layout of the invention for the preferred embodiment. In the Figure, it is possible to observe interaction windows 170 that provide the perspectives 180. Each one of the interaction windows 170 can be provided with certain additional functionality, beyond the one described in this section, in order to facilitate the user interaction. In the preferred embodiment, the existing windows provide the following perspectives:

1. The escalator tree perspective, which shows the escalator tree, and allows to change between normal text or text with projection replacement.
2. The informative tree perspective, which shows the informative tree.
3. The depth perspective, which shows the clarification 1 for each chosen phrase, or clarification 2 if it exists, and it allows projection replacement and expansion of replacing words.
4. The grammatical perspective, as has been explained before.
5. The audiovisual perspective. This perspective plays back a part of the text fragment on which the learner is working (which can be the full fragment), with an intonation and pronunciation that emphasizes the phrases that the user-learner has selected. This perspective is doable only in those cases in which the target language is aural, due to the possibility of using text-to-speech technology, which is very developed.

If the learner is working with a clause such as "the man dressed in red is eating", a possibility would be to playback that clause but emphasizing "dressed in red", applying changes in frequency, syllable length and/or intensity that are characteristic of the target language on which the learner is working. This emphasis can be done with previous recordings or with a text to speech converter.

Adaptation of the Original Text Fragment

The invention is based on a written text, which can be the transcript of an oral sample or of a sample of a signed language. If the direct transcription is not appropriate, it is possible to make some modifications. It is also possible to make modifications when the original fragment has grammatical structures that are very complex, that could even be difficult to understand even with support tools. For example, an original fragment in Spanish such as "Juan es el que vino ayer" could be converted into "Juan es el hombre que vino ayer".

In the preferred embodiment, general word management and edition of parts of the text is made by word tagging, similarly as how it is done in HTML, XML and other computer applications. For instance, a chosen phrase such as "the father", could be really stored in the computer as "<1|the><2|father>". Text tagging is a technique that is used very often and therefore it is considered to be within the prior art.

Concrete Decisions about the Preferred Embodiment

In the preferred embodiment the following decisions have been taken, and these decisions have no limiting effects on the scope of the invention:

1. Division in Sentences

The language samples are divided into sentences, so the learner is working with sentences.

2. Choice of Phrases

Phrases are chosen following the general rules of chomskyan syntax, as it is described in [Radford 1999], [Ouhalla 1999] and [Haegeman 1999]. For the application of these concepts, it is considered that the word groups such as the Spanish word group "despues de" are compounded prepositions (rather than compounded adverbs), so "despues de" would be considered to be a preposition (rather than an adverb). The abbreviation of the main concepts that are used are the following:

| | |
|---|---|
| CP: | Complementizer Phrase |
| IP: | Inflexion Phrase |
| VP: | Verbal Phrase |
| NP: | Noun Phrase |
| AP: | Adjective Phrase |
| PP: | Preposition Phrase |
| DP: | Determinant Phrase |
| BP: | Adverbial Phrase |

The actual criteria used for choosing phrases are shown in Exhibit 11.

Exhibit 11. Criteria for Choosing Phrases

1. Condition a: The phrase is a PP and:
   it does not contain an argument, and adjunct, or a specifier that is a CP. Example: [[The man [in red]] is eating], where "in red" is a chosen phrase.
2. Condition b: The phrase is a DP and:
   it is not an argument, nor adjunct, nor a specifier of a PP, and
   it at least contains:
      a PP as argument, as adjunct or as specifier, or
      a CP as argument, as adjunct or as specifier.
   Example 1: [[The man [in red]] is eating], where "The man in red" is a chosen phrase, because it contains the PP "in red".
   Example 2: [[The man [who is dressed in red]], is eating], where "The man who is dressed in red" is a chosen phrase, because it contains the CP "who is dressed in red".
3. Condition c: The phrase is an AP and:
   It contains at least:
      a PP as argument, as adjunct or as specifier, or
      a CP as argument, as adjunct or as specifier.
   Example: [Joseph is [tired [of working]]], where "tired of working" is a chosen phrase.
4. Condition d: The phrase is a PP and:
   it contains an argument, or an adjunct, or an specifier that is a CP.
   Example: [I have come [so that John can benefit from my help]], where "so that John can benefit from my help" is a chosen phrase.
5. Condition e: The phrase is a CP and:
   it does not behave as an argument, as an adjunct or as a specifier of a PP
   Example: [This is the man [who came yesterday]], where "who came yesterday" is a chosen phrase.
6. Condition f: The phrase is a coordinated clause that does not includes a conjunction that is at its same level.
   Example: [[John is reading] and [Mary is writing]], where "John is reading and Mary is writing", "John is reading" and "Mary is writing" are all chosen phrases.

3. Level Assignment in the Escalator Tree

Figure 5:
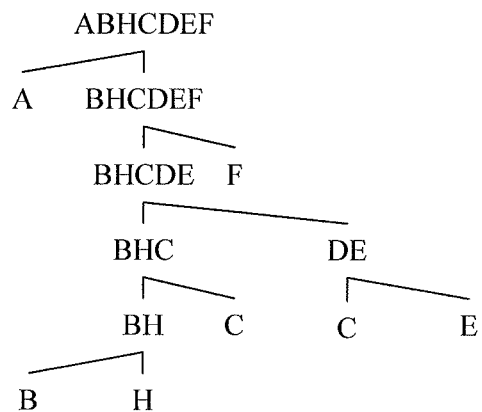
FIG. 5 shows a tree and how the innermost parts usually open last.

In order to codify the level of each sentence component, several mechanisms can be used. In the preferred embodiment, several types of delimiting characters are used. For example, the string ((A) (((((B) (H)) [C]) [(D)[E]] [F])) only uses two types of delimiting characters: parenthesis and brackets. In the preferred embodiment, the parenthesis do not generate a level increase, but the brackets do. FIG. 5 and Exhibit 12 show how the layout of the components of that string varies, as explained below FIG. 5 shows the different embedding levels of the example string. One of the last nodes to be shown would be H. If this structure was a phrase, where H is the head word (for example, a noun phrase where H is the noun), the head word would be shown at the end.

Applying the current criteria for level assignment, the previous string would be shown as can be seen in Exhibit 12. It can be seen that the most relevant part of the phrase, H, is located at the top row, so that it is easily perceived by the user.

Exhibit 12.

| ABH |
|-----|
| CD F |
| E |

The concrete criteria for level assignment in the preferred embodiment are shown in Exhibit 13:

Exhibit 13. Type I Criteria for Level Assignment.
1. The first phrase in a sentence has level 1. (The first phrase is the sentence itself)
2. Those phrases which are complements to a head word have a level that is higher in one unit to the level of that head word.
3. Those phrases which are adjuncts to a head word have a level that is higher in one unit to that head word.

Due to the way how the criteria to choose phrases have been defined, the level of a phrase will be the same as the level of the head word of the equivalent phrase, because its last embedding is the embedding that generates the chosen phrase itself. For example, in "((The man [in red]) is eating)", "The" is the head of "The man in red", In practice, these criteria imply that in a given sentence the grammatical components of the sentence (topic, subject, auxiliaries, verb, direct object, indirect object, adjuncts, beneficiary, attribute and the agent of passive) will all be in the same row, even though in the most general case they have different embedding levels.

4. Links

In the preferred embodiment, the definition of links is based on the following phrase categorization:

Type 1 Phrases. They are PP's that have a CP as argument, or as adjunct or as specifier. The links are those words that act as head of those PP's and CP's that are involved, such as conjunctions, relative pronouns, complementizers in general, and determinants which are located in between those words, as happens in the Spanish sentence "Juan es con el que voy a jugar", where "el" is located between "con" and "que", with "con" being the head of the PP and "que" being the head of the CP.

Type 2 Phrases. These are CP's that are not acting as argument, or adjunct, or specifier of a PP. The coordinated clauses are an example of this type. The links are words that act as head of the CP, such as conjunctions, relative pronouns and complementizers in general. Coordinating conjunctions are included.

Type 3 Phrases. These are PP's that do not have a CP as argument, or as adjunct, or as CP. The links are those prepositions, prepositional compounds, contractions of preposition and article, and in-between determinants, which are head words of the PP's.

5. Other Decisions in the Preferred Embodiment.

The escalator tree of the fragment is build in descending direction, i.e. the level 1 is at the top row.

Horizontal lines are used in the escalator tree, in order to facilitate horizontal reading.

The escalator tree is built using text controls, located in a vertical arrangement, and the sentence is inputted into all of them. The portions of the sentence that should not be visible in certain positions are hidden by making their foreground color be the same as the background color.

Computerized System

In the preferred embodiment, there exist two basic computer systems, which are schematically represented in FIG. 4, the Tool and the Application. The Tool is used by the tutor in order to prepare the language samples. The Application is used by the learner in order to understand the language samples. In the preferred embodiment, both the tool and the application use basic hardware/software means. Such means can have the same type in the Tool and in the Application, or they can have different types.

In the preferred embodiment, the hardware means would be a personal computer, such as the Dell Dimension XPS, that would contain a monitor, a CPU, a keyboard, a mouse, a RAM memory unit, a fixed permanent memory unit (such as hard drive) and a removable permanent memory unit (such as a unit for a diskette). The basic software means include Microsoft Windows 2000 as operating systems, and the device drivers that the manufacturer considers to be appropriate for the devices existing in the computer.

The expert in the field will notice that other hardware means for performing the same function can be used. For example, it is possible to use a SUN workstation, a portable computer or a PDA (Personal Digital Assistant) device. It would be also possible to use other configurations lacking either mouse or keyboard, given that using it would be possible to enter data and manage the screen cursor. For example, in the utilization of personal computers, the "Tab" key is often used to change the control that is to be active in the screen, and the arrow keys are often used to modify the position of the cursor. Similarly, there could be other configurations not using either mouse nor keyboard, but other interacting means such as an electronic pen or tactile screens. Similarly as well, it would be possible that the system would not have a removable permanent memory unit, with data created by the Tool being transferred to the Application by some teleinformatic connection, such as a modem and the telephone line. Besides that, the system does not need to be a local system, but it could be a terminal that interoperates with a remote server. The expert in the field will also notice that besides the operating system chosen for the preferred embodiment, there are other operating systems that can perform the same function.

DESCRIPTION OF SOME ALTERNATIVE EMBODIMENTS

A possible alternative is to create the Application so that it shows the perspectives in a fixed fashion, rather than allowing interactions.

Other possibilities that exist to embody the invention are based on modifying the characteristics of the platforms on which the invention is used, for example by employing a television or text documents.

Other alternative is to choose different criteria for assigning levels, so that other types of phrases or word groups are more salient.

On the other hand, it is also possible to create the escalator tree marking level changes that are higher than one. This means that when moving from a word to the next one, the codified level change could be for example of two lines. In order to codify the separated sentence in this case, it could be possible to use additional delimiter characters, such as "{" and "}" or compounded characters, such as for example "(#" and ")#", which would cover a higher number of level changes.

Other possible embodiment has to do with the creation of the escalator tree in descending direction, i.e. starting on the bottom row and expanding the tree towards the upper rows.

In yet another embodiment, the criteria to choose phrases are different. For example, they can be modified so that condition (b), previously shown in Exhibit 11, would be replaced by the condition (b) that is shown in Exhibit 14. This new criteria list is called "Type II Criteria for Choosing Phrases".

Exhibit 14. Type II Criteria for Choosing Phrases
The criteria to choose phrases Type II are the same as the criteria Type I except for the fact that condition b in the Type I criteria is replaced by the following condition b:
2. Condition b: The phrase is a DP and:
  It is not an argument, nor an adjunct, or a specifier to a PP.
  Example: [John is eating [a sandwich]], where "a sandwich" is a chosen phrase.

Another possible alternative would be achieved by considering that the expressions such as the Spanish word group "después de" are adverbial phrases in which the head word is an adverb, such as "después" and that the prepositional phrase is an argument. In this case, the alternative list of criteria would be equivalent to the previous one, but adding condition g, which is shown in Exhibit 15.

Exhibit 15. Type III Criteria for Choosing Phrases
7. Condition g: The phrase is a BP and:
  it contains at least:
    a PP as argument, as adjunct or as specifier or
    a CP as argument, as adjunct, or as specifier
  Example: the Spanish sentence [Pepe vendrá [después [del trabajo]]], where "después del trabajo" is a chosen phrase.

The invention claimed is:
1. A method for facilitating the comprehension of a target language, wherein
  said method is applied over one or more samples of such target language,
  said method facilitates a user to comprehend the structure of said samples of said target language, therefore facilitating comprehending the meaning of said samples of said target language,
  said method is executed upon in at least one computerized system,
  said method comprises the following steps:
  providing a memory unit that contains at least one sample of said target language,
  providing a display,
  providing a processing unit,
  retrieving said target language sample from said memory unit,
  identifying a set of phrases in said target language sample, wherein each phrase comprises one or more words, and each word has an embedding level, wherein said set of phrases comprises a first phrase and a second phrase, said first phrase being a parent phrase, wherein
  i. said second phrase is a child phrase to said parent phrase, and
  ii. said parent phrase comprises words on both sides of said child phrase,
  identifying a first word in said target language sample,
  displaying said first word in said display,
  performing the following steps over each remaining word that belongs to the rest of the words in said target language sample:
  a. identifying said remaining word,
  b. obtaining a vertical position for said remaining word, wherein said vertical position is separated from the vertical position of any previous displayed word by a vertical distance, said vertical distance being higher the higher the difference in embedding levels of said remaining word and said any previous displayed word, and
  c. displaying said remaining word in said display in said vertical position.

2. A method as claimed in claim 1, further comprising the steps of:
  identifying a minimal phrase of a position in said language sample, wherein the minimal phrase of a position in said language sample is the phrase that covers that position and that does not contain any other phrase that covers that position, and
  graphically emphasizing said minimal phrase in said display.

3. A method as claimed in claim 1, further comprising the steps of identifying the chosen phrase that is the parent of the chosen phrase that is selected at a given moment and selecting said parent phrase in said display.

4. A method as claimed in claim 1, further comprising the steps of collapsing and expanding phrases, wherein
  said collapsing reduces the vertical distance between the position of the words of said phrase and a reference position and
  said expanding increases the vertical distance between the position of the words of said phrase and a reference position,
  wherein said reference position is the position that the words of said sample of target language had before any vertical move is applied to any of said words.

5. A non transitory computer readable medium storing a computer program that when executed by one or more processors of one or more computers, allows said one or more processors to allows said one or more processors to perform the following steps:
  retrieving said target language sample from said memory unit,
  identifying a set of phrases in said target language sample, wherein each phrase comprises one or more words, and each word has an embedding level, wherein said set of phrases comprises a first phrase and a second phrase, said first phrase being a parent phrase, wherein
  i. said second phrase is a child phrase to said parent phrase, and
  ii. said parent phrase comprises words on both sides of said child phrase,
  identifying a first word in said target language sample,
  displaying said first word in a display, performing the following steps over each remaining word that belongs to the rest of the words in said target language sample:
a. identifying said remaining word,
b. obtaining a vertical position for said remaining word, wherein said vertical position is separated from the vertical position of any previous displayed word by a vertical distance, said vertical distance being higher the higher the difference in embedding levels of said remaining word and said any previous displayed word, and
c. displaying said remaining word in said display in said vertical position.

6. A non transitory computer readable medium storing a computer program that when executed by one or more processors of one or more computers, allows said one or more processors to allows said one or more processors to perform the following steps:
retrieving said target language sample from said memory unit,
identifying a first phrase, said first phrase being a parent phrase, and a second phrase in said sample, wherein
i. said second phrase is a child phrase to said parent phrase, and
ii. said parent phrase comprises words on both sides of said child phrase
choosing an increment value, which can be positive or negative,
displaying a first group of words, said group of words being the words of said parent phrase that do not belong to said child phrase
displaying said child phrase, wherein the position of any of the words that belong to said child phrase have a vertical displacement with respect to any of the words of said first group of words, said vertical displacement being equal to said increment value.

7. A method for facilitating the comprehension of a target language, wherein
said method is applied over one or more samples of such target language,
said method facilitates a user to comprehend the structure of said samples of said target language, therefore facilitating comprehending the meaning of said samples of said target language,
said method is executed upon in at least one computerized system,
said system comprises the following steps:
providing a memory unit that contains at least one sample of said target language,
providing a display,
providing a processing unit,
retrieving said target language sample from said memory unit,
identifying a first phrase, said first phrase being a parent phrase, and a second phrase in said sample, wherein
i. said second phrase is a child phrase to said parent phrase, and
ii. said parent phrase comprises words on both sides of said child phrase
choosing an increment value, which can be positive or negative,
displaying a first group of words, said group of words being the words of said parent phrase that do not belong to said child phrase
displaying said child phrase, wherein the position of any of the words that belong to said child phrase have a vertical displacement with respect to any of the words of said first group of words, said vertical displacement being equal to said increment value.

8. A non transitory computer readable medium as claimed in claim 5, further comprising the steps of:
identifying a minimal phrase of a position in said language sample, wherein the minimal phrase of a position in said language sample is the phrase that covers that position and that does not contain any other phrase that covers that position, and
graphically emphasizing said minimal phrase in said display.

9. A method as claimed in claim 5, further comprising the step of graphically emphasizing a phrase in said display.

10. A method as claimed in claim 9, further comprising the steps of
identifying a parent phrase that is the parent of said graphically emphasized phrase, and
graphically emphasizing said parent phrase in said display.

11. A non transitory computer readable medium as claimed in claim 5, further comprising the steps of collapsing and expanding chosen phrases, wherein
(a) said collapsing reduces the vertical distance between the position of the words of said chosen phrase and a reference position and
(b) said expanding increases the vertical distance between the position of the words of said chosen phrase and a reference position,
wherein said reference position is the position that the words of said sample of target language had before any vertical move is applied to any of said words.

12. A non transitory computer readable medium as claimed in claim 6, further comprising the steps of:
identifying a minimal phrase of a position in said language sample, wherein the minimal phrase of a position in said language sample is the phrase that covers that position and that does not contain any other phrase that covers that position, and
graphically emphasizing said minimal phrase in said display.

13. A method as claimed in claim 6, further comprising the step of graphically emphasizing phrase in said display.

14. A method as claimed in claim 13, further comprising the steps of:
identifying a parent phrase that is the parent of said graphically emphasized phrase, and
graphically emphasizing said parent phrase in said display.

15. A non transitory computer readable medium as claimed in claim 6, further comprising the steps of collapsing and expanding chosen phrases, wherein
said collapsing reduces the vertical distance between the position of the words of said chosen phrase and a reference position and
said expanding increases the vertical distance between the position of the words of said chosen phrase and a reference position,
wherein said reference position is the position that the words of said sample of target language had before any vertical move is applied to any of said words.

16. A non transitory computer readable medium as claimed in claim 7, further comprising the steps of:
identifying a minimal phrase of a position in said language sample, wherein the minimal phrase of a position in said language sample is the phrase that covers that position and that does not contain any other phrase that covers that position, and
graphically emphasizing said minimal phrase in said display.

17. A method as claimed in claim 7, further comprising the step of graphically emphasizing a phrase in said display.

18. A method as claimed in claim 17, further comprising the steps of
- identifying a parent phrase that is the parent of said graphically emphasized phrase, and
- graphically emphasizing said parent phrase in said display.

19. A non transitory computer readable medium as claimed in claim 7, further comprising the steps of collapsing and expanding chosen phrases, wherein
- said collapsing reduces the vertical distance between the position of the words of said chosen phrase and a reference position and
- said expanding increases the vertical distance between the position of the words of said chosen phrase and a reference position,
- wherein said reference position is the position that the words of said sample of target language had before any vertical move is applied to any of said words.

20. A method as claimed in claim 1, further comprising the step of graphically emphasizing a phrase in said display.

21. A method as claimed in claim 20, further comprising the steps of:
- identifying a parent phrase that is the parent of said graphically emphasized phrase, and
- graphically emphasizing said parent phrase in said display.

\* \* \* \* \*